(12) United States Patent
Donley et al.

(10) Patent No.: US 11,398,864 B2
(45) Date of Patent: Jul. 26, 2022

(54) LIGHT COMMUNICATION BETWEEN AIRCRAFT

(71) Applicant: Bell Textron Inc., Fort Worth, TX (US)

(72) Inventors: Daniel Duane Donley, Bedford, TX (US); Michael Raymond Hull, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/129,900

(22) Filed: Dec. 21, 2020

(65) Prior Publication Data

US 2022/0200703 A1 Jun. 23, 2022

(51) Int. Cl.
| | |
|---|---|
| H04B 10/00 | (2013.01) |
| H04B 10/114 | (2013.01) |
| H04B 10/50 | (2013.01) |
| G01S 5/16 | (2006.01) |
| B64D 47/02 | (2006.01) |
| H04B 10/69 | (2013.01) |

(52) U.S. Cl.
CPC ......... H04B 10/1143 (2013.01); B64D 47/02 (2013.01); G01S 5/16 (2013.01); H04B 10/502 (2013.01); H04B 10/503 (2013.01); H04B 10/69 (2013.01); B64D 2203/00 (2013.01)

(58) Field of Classification Search
CPC ... H04B 10/11; H04B 10/112; H04B 10/1123; H04B 10/114; H04B 10/1143; H04B 10/1149; H04B 10/116; H04B 10/40; H04B 10/118; H04B 10/1125; H04B 10/1127; H04B 10/1129

USPC ....... 398/118, 119, 120, 121, 122, 123, 124, 398/125, 126, 127, 128, 130, 129, 131, 398/135, 136, 115, 158, 159, 172
See application file for complete search history.

(56) References Cited

U.S. PATENT DOCUMENTS

| | | | |
|---|---|---|---|
| 8,188,878 B2 * | 5/2012 | Pederson ......... | G08B 13/19647 340/815.45 |
| 9,231,698 B2 | 1/2016 | Erkmen et al. | |

(Continued)

FOREIGN PATENT DOCUMENTS

WO 2019/077315 A1 4/2019

OTHER PUBLICATIONS

European Patent Office, "European Search Report," EP Application No. 21213989.3, May 23, 2022, 6 pages, published Munich, Germany.

(Continued)

*Primary Examiner* — Hanh Phan
(74) *Attorney, Agent, or Firm* — Fogarty LLP

(57) ABSTRACT

Embodiments are directed to systems and methods for providing light communication (LC) for an aircraft. An LC transmitter is mounted on an aircraft fuselage and is configured to broadcast light signals within a defined region outside the aircraft. An LC receiver mounted on the aircraft fuselage is configured to receive light signals broadcast by a remote LC device. A controller is configured to manage LC signals in the aircraft, and an interface is provided between the controller and an aircraft data network. The light signals may be in a visible light spectrum, an invisible light spectrum, or both. The remote LC device may be, for example, a ground station, an aircraft, a ground vehicle, a ship, a building, or a portable transmitter.

20 Claims, 7 Drawing Sheets

(56) References Cited

U.S. PATENT DOCUMENTS

| | | | |
|---|---|---|---|
| 10,532,826 | B2 | 1/2020 | Wise |
| 10,543,933 | B1 | 1/2020 | Tillotson |
| 2012/0075121 | A1 | 3/2012 | O'Hara et al. |
| 2013/0315604 | A1 | 11/2013 | Lopresti et al. |
| 2015/0326313 | A1* | 11/2015 | Brouillet ............ H04B 10/1129 398/131 |
| 2015/0349882 | A1* | 12/2015 | Lamkin .............. H04B 10/1123 398/121 |
| 2020/0029227 | A1 | 1/2020 | Misenheimer et al. |
| 2020/0195343 | A1* | 6/2020 | Solanki ................. H04W 88/16 |
| 2020/0266892 | A1* | 8/2020 | Schwartz ........... H04B 10/1149 |
| 2021/0067249 | A1* | 3/2021 | Hull ..................... H04B 10/502 |

OTHER PUBLICATIONS

M.S.M. Gismalla, et al., "Design of an optical attocells configuration for an indoor visible light communications system", AEU—International Journal of Electronics and Communications, vol. 112, Dec. 2019, XP085891511, ISSN: 1434-8411, DOI: 10.1016/J.AEUE.2019.152946, Elsevier, Amsterdam, NL.

* cited by examiner

LIGHT COMMUNICATION BETWEEN AIRCRAFT

TECHNICAL FIELD

This invention relates generally to electronic systems in aircraft, and more particularly, to using light communication (LC) between aircraft or between an aircraft and a ground station.

BACKGROUND

Aircraft, such as rotorcraft and tiltrotor aircraft, communicate with each other and with ground stations, such as air traffic control, using radio frequency (RF) communications. Use of RF communication can present several problems, such as interference and security concerns. Interference may be caused by atmospheric noise created by lightning, for example. Additionally, interference may be caused when multiple aircraft attempt to use the same RF channel at the same time, such as for mission communications, and different users broadcast simultaneously on the channel. RF signals generally radiate signals in all directions and can be easily intercepted, which raises security concerns for aircraft transmissions. Accordingly, there is a need for a secure and interference-free communication system for use with aircraft. Another problem with RF communications is the limited bandwidth available and the restrictions to use only the frequency bands assigned by the Federal Communications Commission (FCC).

SUMMARY

Embodiments are directed to systems and methods for providing Li-Fi (light fidelity) communication between aircraft or between an aircraft and a ground station using external lighting. The light communication may include, for example, voice, location, and/or aircraft data.

In an example embodiment, an access point for providing light communication for an aircraft, comprises an LC transmitter mounted on an aircraft fuselage, wherein the LC transmitter is configured to broadcast light signals within a defined region outside the aircraft, and an LC receiver mounted on the aircraft fuselage, wherein the LC receiver is configured to receive light signals broadcast by a remote LC device. A controller is coupled to the LC transmitter and to the LC receiver. The controller is configured to manage LC signals in the access point. An interface is provided between the controller and an aircraft data network. The LC transmitter may be a Light Emitting Diode (LED) or a laser. The LC receiver may be a photodetector. The light signals may be in a visible light spectrum, an invisible light spectrum, or both. The remote LC device may be, for example, a ground station, an aircraft, a ground vehicle, a ship, a building, or a portable transmitter.

The access point may further comprise a processor in the controller that is configured to control the access point according to executable code. The access point may include memory for storing data and executable code, wherein the executable code comprises instructions for causing the access point to establish light communication with the remote LC device.

The executable code may comprise instructions for causing the processor to identify a relative location of the remote LC device to the aircraft based upon LC signals received from the remote LC device. The executable code may comprise instructions for causing the processor to enable or disable one or more functions on the aircraft based upon the relative location of remote LC device.

The executable code may comprise instructions for causing the processor to receive a first set of LC signals from a first device via the LC receiver and to transmit the first set of LC signals to a second device via the LC transmitter.

The executable code may comprise instructions for causing the processor to establish a session with the remote LC device using light communication with the access point and to exchange session data with the remote LC device. The session and session data may be associated with one or more aircraft navigation, communication, or flight control systems.

In another example embodiment, a method comprises receiving a first light communication signal at an LC receiver mounted on an aircraft fuselage, decoding the first LC signal to extract first data, providing the first data to an aircraft system, receiving second data from the aircraft system, encoding the second data to create a second LC signal, and transmitting the second LC signal at an LC transmitter mounted on the aircraft fuselage. The aircraft system may be one or more of an aircraft navigation, communication, or flight control system.

The method may further comprise identifying a location of a remote LC device relative to the aircraft based upon the first LC signal.

The method may further comprise enabling or disabling one or more functions on the aircraft based upon the relative location of remote LC device, The method may further comprise a first LC signal that is received from a first remote LC device, and a second LC signal that is transmitted to a second remote LC device, wherein the content of the first data and the second data are substantially the same so that the first remote LC signal is relayed from the first remote LC device to the second remote LC device.

BRIEF DESCRIPTION OF THE DRAWINGS

Figure 1:
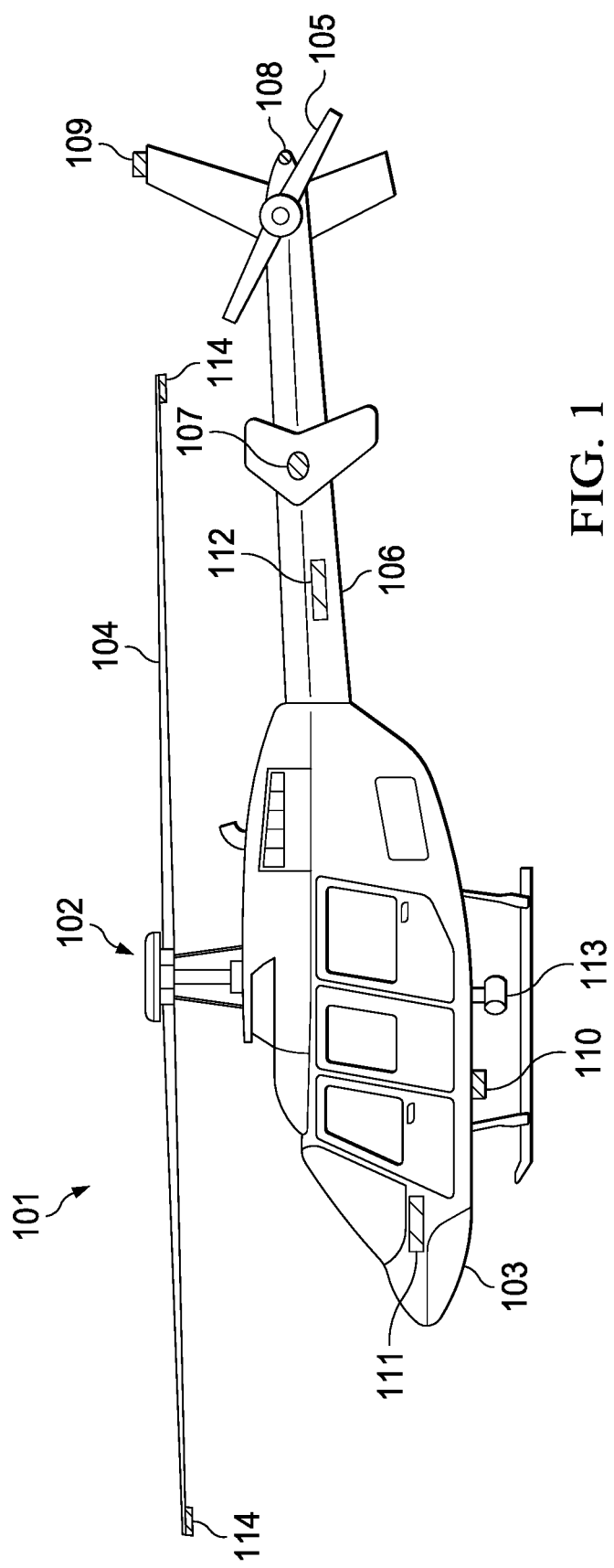

Having thus described the invention in general terms, reference will now be made to the accompanying drawings, which are not necessarily drawn to scale, and wherein:

FIG. 1 is a side view of an example helicopter capable of being used with embodiments of the disclosed redundant impact-resistant structures.

Figure 2:
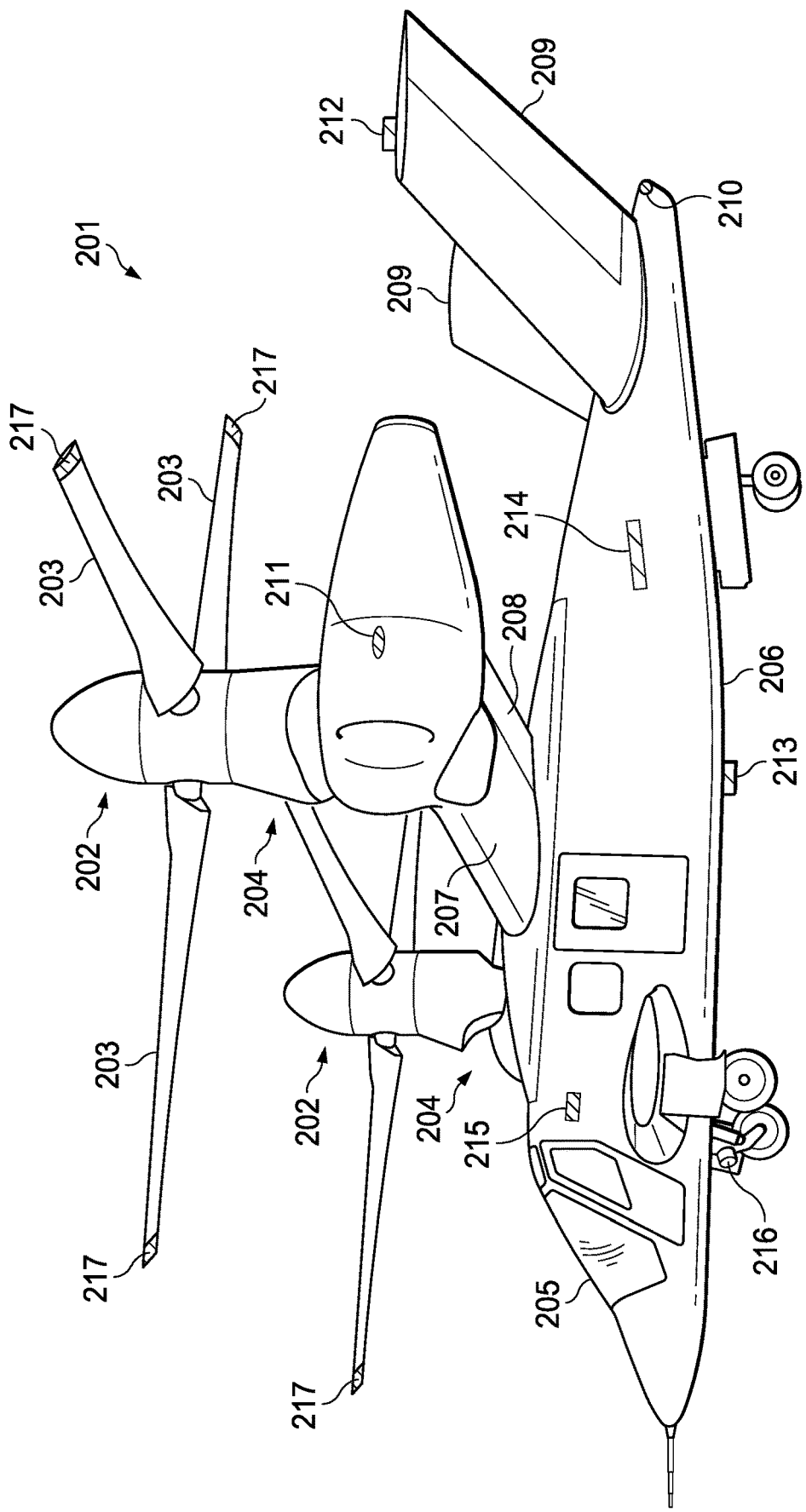

FIG. 2 is a side view of an example tiltrotor aircraft capable of being used with embodiments of the redundant impact-resistant structures.

Figure 3:
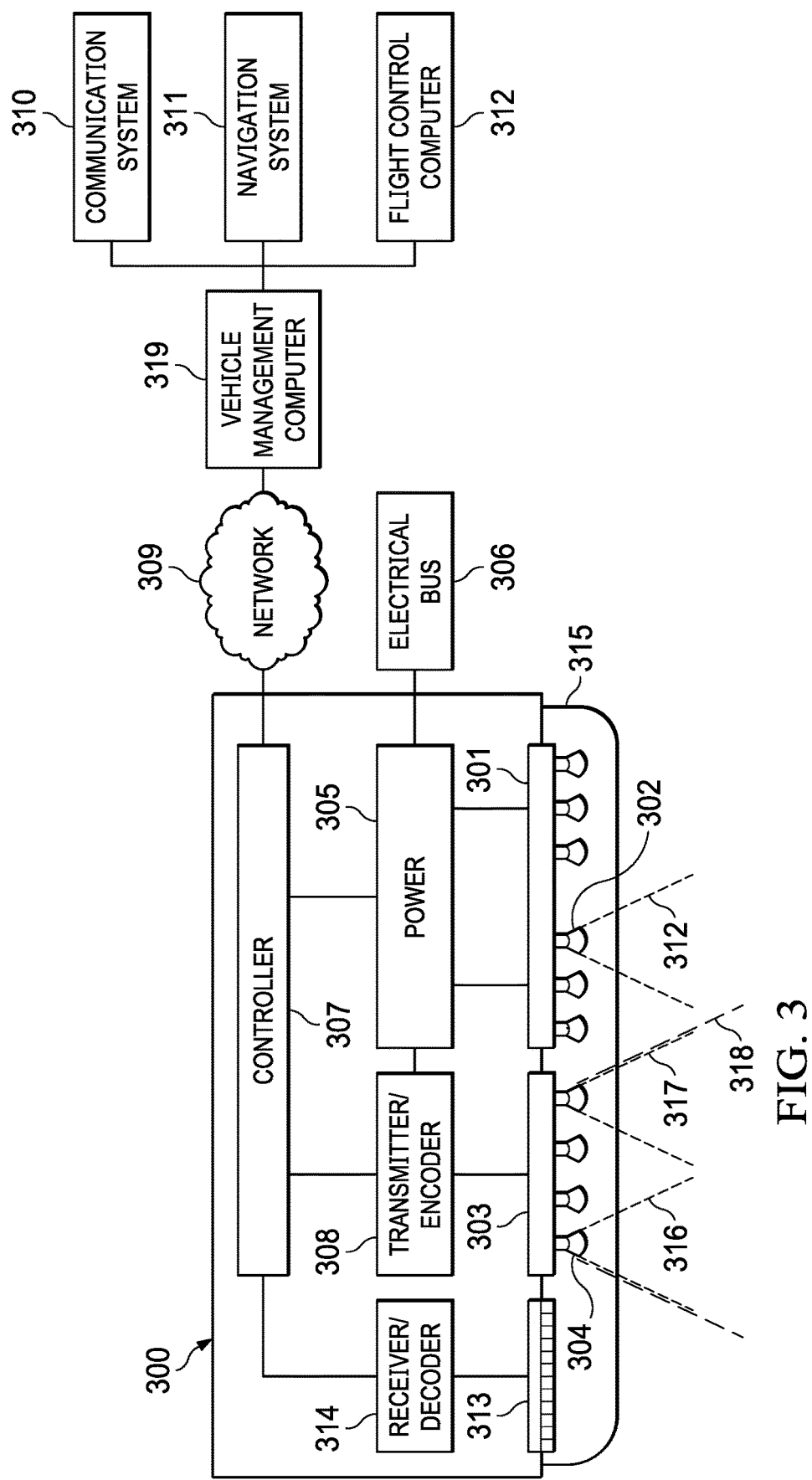

FIG. 3 depicts a light communication access point for use in an aircraft according to an example embodiment.

Figure 4:
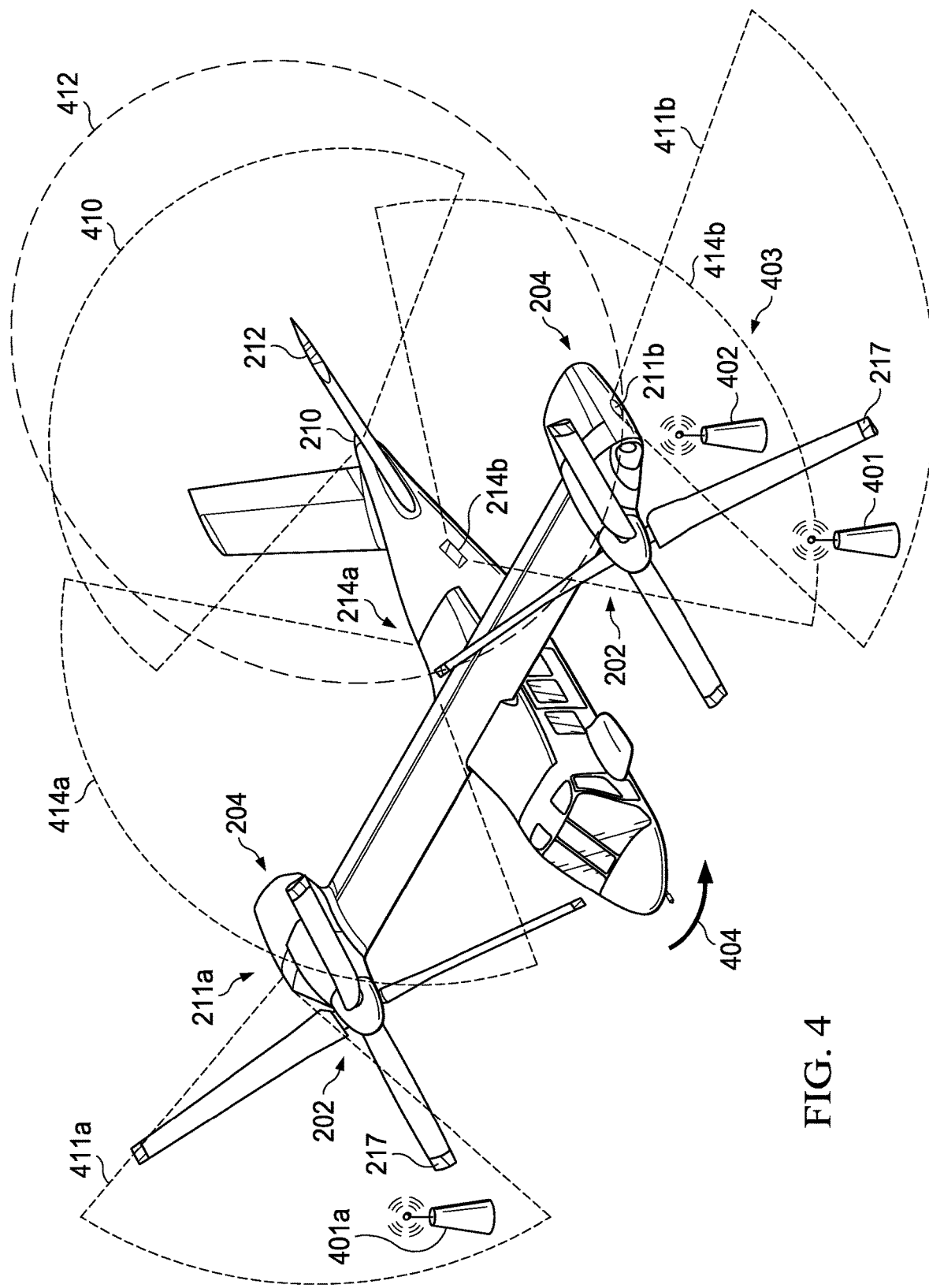

FIG. 4 is an oblique view of a tilt-rotor aircraft depicting various optical attocells supported by different exterior aircraft lights.

Figure 5:
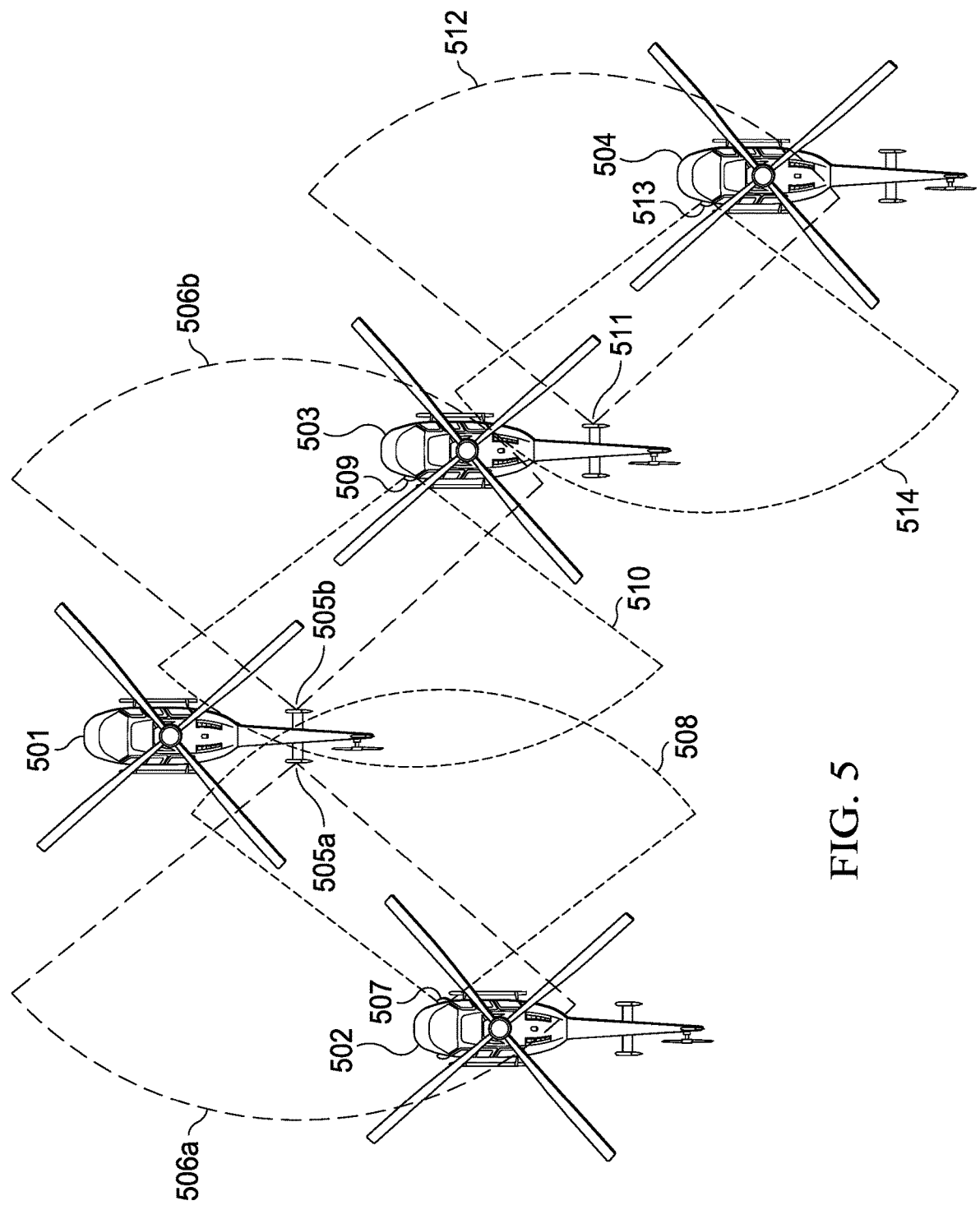

FIG. 5 depicts a group of aircraft that are configured to use light communication as disclosed herein.

Figure 6:
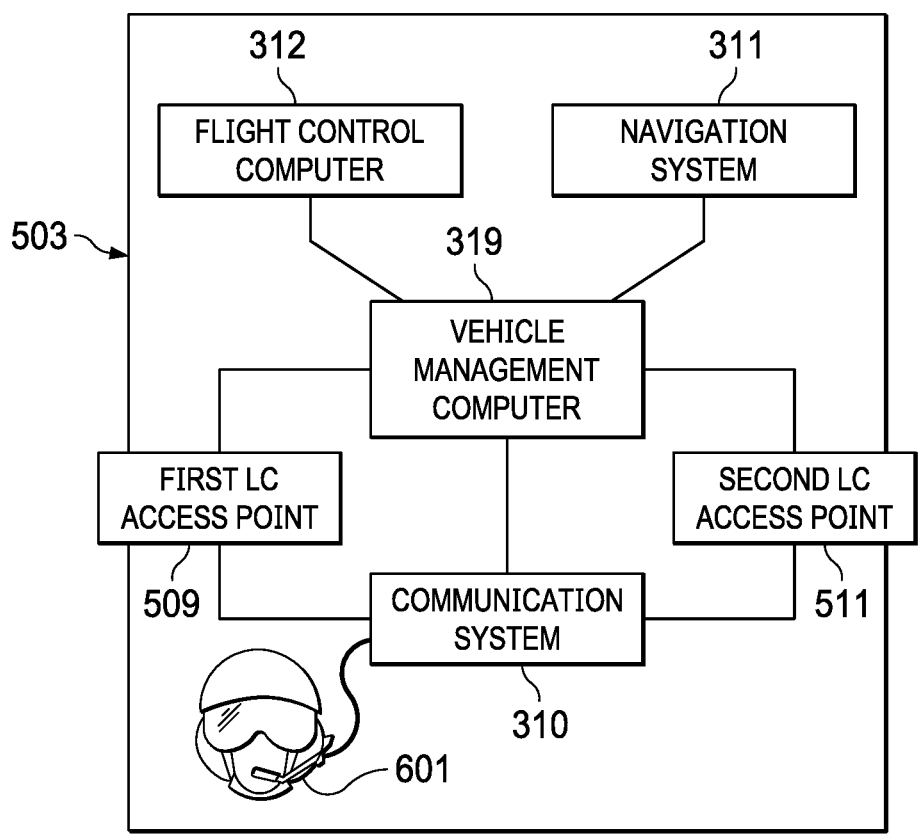

FIG. 6 is a block diagram illustrating systems within an aircraft that support light communication relay functionality in an example embodiment.

Figure 7:
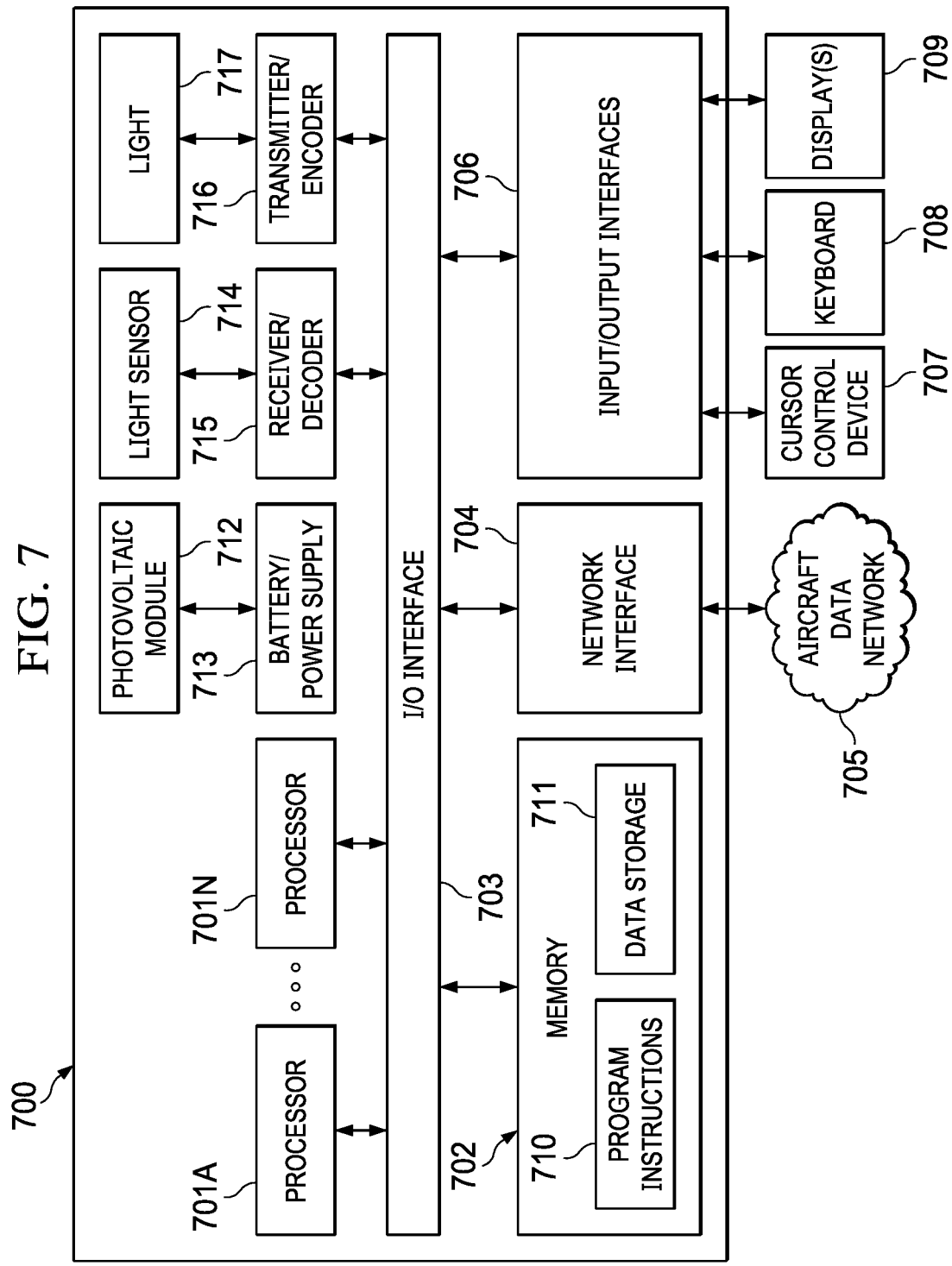

FIG. 7 is a block diagram illustrating a device capable of light communication according to an example embodiment.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIGS. 1 and 2 are schematic diagrams of two different rotorcraft capable of being used with embodiments of the light communication systems and methods disclosed herein. FIG. 1 is a side view of an example helicopter 101, and FIG. 2 is an oblique view of an example tiltrotor aircraft 201. Helicopter 101 includes a rotary system 102 carried by a fuselage 103. Rotor blades 104 connected to the rotary system 102 provide lift to enable flight for helicopter 101. The rotor blades 104 are controlled by multiple controllers within fuselage 103. The pitch of each rotor blade 104 can be manipulated to selectively control direction, thrust, and lift of the helicopter 101. For example, during flight a pilot can manipulate a cyclic controller to change the pitch angle of rotor blades 104 and/or manipulate pedals to provide vertical, horizontal, and yaw flight movement. Helicopter 101 can further include an anti-torque system 105 mounted on an empennage 106.

Helicopter 101 may have one or more external lights. Position or navigation lights 107 and 108 allow other pilots and ground personal to determine the relative position and direction of helicopter 101 at night and in low-light conditions. Typically, aircraft regulations require that tail position light 108 be a steady white light and forward position lights 107 be a steady red light on the port/left side of the aircraft and a steady green light on the starboard/right side of the aircraft. Top anti-collision light 109 and bottom anti-collision light 110 may be, for example, a high-intensity white or red strobe light. The anti-collision light 110 may also be a rotating beacon type. Aircraft equipped with an anti-collision light system are typically required to operate the anti-collision lights during all types of flight or ground operation unless adverse meteorological conditions would cause the anti-collision lights to be a hazard to safety. Helicopter 101 may also have formation lights 111, 112 located on various parts of the fuselage 103 or empennage 106 to allow other aircraft to fly close formation at night. Additional lighting systems may also be installed on helicopter 101, such a steerable spotlight 113 that can be rotated in multiple dimensions and pointed along any azimuth or elevation. Helicopter 101 may also have rotor tip lights 114 on some or all of the rotor blades 104. Rotor tip lights 114 may be configured to broadcast light above, below, and/or laterally out from rotor blade 104.

Tiltrotor aircraft 201 includes two or more rotary systems 202 having multiple rotor blades 203 and carried by rotatable nacelles 204. The rotatable nacelles 204 provide means for allowing aircraft 201 to take-off and land like a conventional helicopter, and for horizontal flight like a conventional fixed wing aircraft. Like the helicopter 101, the tiltrotor aircraft 201 includes controls, e.g., cyclic controllers and pedals, carried within the cockpit 205 of fuselage 206, for causing movement of the aircraft and for selectively controlling the pitch of each blade 203 to control the direction, thrust, and lift of tiltrotor aircraft 201.

Although FIG. 2 shows tiltrotor aircraft 201 in a helicopter mode wherein rotor blades 203 are oriented substantially vertical to provide a lifting thrust. It will be understood that in other embodiments, tiltrotor aircraft 201 may operate in an airplane mode wherein rotor blades 203 are oriented substantially horizontal to provide a forward thrust. Rotor blades 203 may also move between the vertical and horizontal positions during flight as tiltrotor aircraft 201 transitions between a helicopter mode and an airplane mode. Wings 207 may provide lift to tiltrotor aircraft 201 in certain flight modes (e.g., during forward flight airplane mode) in addition to supporting rotatable nacelles 204 and rotary systems 202. Control surfaces 208 on wings 207 and/or control surfaces 209 on a tail section may be used to adjust the attitude of tiltrotor aircraft 201 around the pitch, roll, and yaw axes while in airplane mode. Control surfaces 208 and 209 may be, for example, ailerons, flaps, slats, spoilers, elevators, or rudders that are controlled by cyclic controllers, pedals, or other flight controls within cockpit 205 of fuselage 206.

Like helicopter 101, tiltrotor aircraft 201 may have one or more external lights. Tail position light 210 and wingtip position lights 211 allow other pilots and ground personal to determine the relative position and direction of tiltrotor aircraft 201 at night and in low-light conditions. Top anti-collision light 212 and bottom anti-collision light 213 may be, for example, a high-intensity white strobe light or a red rotating beacon light. Formation lights 214 and 215 are located on fuselage 206 and allow other aircraft to fly close formation at night. Additional lighting systems may also be installed on tiltrotor aircraft 201, such landing light 216 or landing gear down-and-locked lights, fuselage lights, logo lights, and steerable spotlight (not shown). Tiltrotor aircraft 201 may also have rotor tip lights 217 on some or all of the rotor blades 203. Rotor tip lights 217 may be configured to broadcast light above, below, and/or laterally out from rotor blade 203.

Embodiments of the present disclosure are not limited to any particular setting or application, and embodiments can be used with other aircraft, vehicles, ships, or equipment. It will be understood that aircraft 101 and 201 are used merely for illustration purposes and that any aircraft, including fixed wing, rotorcraft, commercial, military, or civilian aircraft, or any other non-aircraft vehicle may use the light communication systems and methods as disclosed herein. Additionally, such vehicles may be manned or unmanned and may be controlled by an onboard or remote human or autopilot.

Typically, communications between aircraft are provided using radios that support RF voice, data links, etc. over frequencies within a defined communications band, such as the HF, VHF, or UHF bands. These RF communication methods use a lot of power and radiate long distances. RF communications can be easily detected and received. In a military or law enforcement application, this may be undesirable when stealth and secure communications are desired or required. Aircraft also use RF communications to communicate with ground stations including, for example, air traffic control operations, mission command, weather stations, and navigation aids.

As disclosed herein, in addition to, or instead of, using RF communication, aircraft may use light communication (LC) to communicate with other aircraft and/or with ground stations. Using LC between aircraft reduces the electronic signature emanating from each aircraft, due to lower power, which improves security and stealth capabilities of the aircraft. Any information may be communicated to and from the aircraft using LC, such as voice transmissions, location data, aircraft status data, mission data, etc.

In one embodiment, LC is supported using existing aircraft lighting systems, such as position, navigation, anti-collision, formation, landing, and rotor tip lights 107-114, 210-217 or using moveable light systems such as a controllable spotlight 113. When using an existing aircraft lighting system, the existing light, such as a position light, may be modulated (e.g., turned off and on) with LC signals so that data can be carried by the existing light. The LC data rate is sufficiently high that an existing light that is required to be steady on, such as a position light, would appear to be always on to a human observer. Alternatively, one or more of aircraft lights 107-114, 210-217 may function as an LC access point that services its own limited area.

FIG. 3 depicts a light communication access point 300 for use on an aircraft according to an example embodiment. A first set of one or more lights 301 having a plurality of bulbs 302, such as LEDs, incandescent, or fluorescent bulbs, provide visible light for position, anti-collision, formation, or other exterior lighting. A second set of one or more lights 303 having a plurality of bulbs 304, such as LEDs or laser lights, for example, are adapted for transmitting data using visible or invisible (i.e., infrared frequencies/wavelengths not visible to the human eye) light communications. Power supply 305 receives power from an aircraft electrical bus 306, such as an avionics bus or accessory bus that is connected to an aircraft generator or battery. Power supply 305 provides power to drive exterior aircraft light 301 and LC light 303. The exterior aircraft light 301 may be selected on or off by a crewmember, for example. Controller 307 may manage when light communication is available using LC light 303 and at what frequencies.

LC light 303 may use a plurality of LEDs 304, for example. LC light 303 may use invisible (e.g., infrared) and/or visible light spectrum for high speed data communication. The total size of the infrared and visible light spectrum is approximately 2600 times the size of the entire RF spectrum. LEDs have been shown to enable data rates up to 5 Gbps with peak transmission speeds of 8 Gbps using with a single LED. Data rates higher than 100 Gbps are feasible with laser-based lighting. Accordingly, LC can vastly extend the available bandwidth for wireless communication devices. Communication protocols available for LC may be referred to as Li-Fi (Light Fidelity) or Optical Wireless Communication (OWC) and may be defined in IEEE 802.11, IEEE 802.15.7, 802.15.13, or other standards.

Data is transmitted using light communication by encoding data bits from controller 307 into an LC signal using transmitter/encoder 308. That encoded LC signal then drives LC light 303, which broadcast the information as visible or invisible light signals using blubs 304. Each of the individual blubs 304 of LC light 303 may transmit data over the same frequency, or groups of one or more bulbs 304 may transmit data on different frequencies. This allows the aircraft to transmit either the same data on multiple frequencies or to transmit different sets of data on different frequencies.

Controller 307 is coupled to an aircraft data network 309 that carries information, such as digital bit streams, packet data, voice, video, text, or other content. Network 309 may couple controller 307 to other aircraft systems, such as a communication system 310, navigation system 311, or flight control computer 312, for example. Controller 307 may be coupled directly to other aircraft systems or may interface with a vehicle management system (VMC) 319. VMC 319 links the aircraft's computers and networks, manages the aircraft's avionics and flight controls, supports high-speed communications, and enables fly-by-wire and autonomous flight capabilities. Controller 307 receives information to be broadcast from VMC 319 or aircraft systems 310-312 and sends that information to transmitter/encoder 308, which encodes the information as digital signals that are transmitted by LC data light 303 in the visible and/or invisible spectrum.

Light communication access point 300 may further comprise a light sensor 313 that is configured to detect visible and/or invisible light. Light sensor 313 generates an electronic signal based upon detected light and sends that signal to receiver/decoder 314. Data bits that are carried by the received light are extracted by receiver/decoder 314. The extracted bits may carry information that can be processed by controller 307 and forwarded to VMC 319 and aircraft systems 310-312 via data network 309. Light sensor 313 may be, for example, a camera, image sensor, or photodetector, such as a CMOS sensor or other electronic chip that converts photons to electrons for digital processing.

Light communication access point 300 may be installed on or embedded in the fuselage of an aircraft, such as at the usual location for position lights, formation lights, anti-collision lights, etc. or at any other location that allows for sufficient transmission and reception of LC signals. When installed in a location typically used for a position light, formation light, anti-collision light, for example, the exterior aircraft light 301 provides the corresponding position, formation, or anti-collision lighting function and operates as normally expected (e.g., appropriate color, appropriate steady/flashing action, controlled by pilot, etc.).

Light communication access point 300 may include a clear, transparent, translucent, or partially opaque cover 315 to protect lights 301, 303, bulbs 302, 304, and sensor 313. Cover 315 may be designed to allow visible and/or invisible light of certain desired frequencies to pass through to sensor 313 and out from LC light 303 and aircraft exterior light 301. In one embodiment, cover 315 may be configured to filter and/or polarize light passing into sensor 313 and/or from LC light 303 and aircraft exterior light 301. Such filtering and/or polarization may function to optimize received and/or transmitted light signals and to ensure that desired frequencies are passed while undesired frequencies are blocked.

Each set of LC lights 303 and each individual bulb or LED 304 therein may be configured to broadcast in a particular emission spectrum and broadcast pattern. The broadcast pattern may define a particular coverage region or optical attocell 316, 317. Individual bulb or LED 304 may have its own attocell 316, 317, such as when different bulbs or LEDs 304 are broadcasting at different frequencies. The coverage regions or optical attocells 316, 317 may or may not overlap depending on how each bulb or LED 304 is positioned and operated by controller 307 and/or transmitter/encoder 308. Alternatively, multiple bulbs or LEDs 304 may be synchronized, under the direction of controller 307 and/or transmitter/encoder 308, for example, to broadcast the same data and create a larger coverage region or optical attocell 318.

Although FIG. 3 illustrates a device that combines exterior aircraft light 301, LC light 303, and sensor 313 in a single device, it will be understood that in other embodiments only the LC transmit components (i.e., transmitter/encoder 308 and light transmitter 303) or only LC receive components (i.e., light sensor 313 and receiver/decoder 314) are provided in the LC access point 300. Such single-direction LC systems may be used, for example, when a remote LC communication device needs only to transmit or only to receive data via an LC channel. Similarly, in other embodiments, various combinations of exterior aircraft lights 301, LC lights 303, and sensors 313 may be of included or excluded in light communication access point 300. Controller 307, transmitter/encoder 308, and/or receiver/decoder 314 may be included as components of light communication access point 300 as shown in FIG. 3 or, in other embodiments, may be located in a separate device or location and be connected remotely to exterior aircraft lights 301, LC lights 303, and sensors 313 as appropriate.

FIG. 4 is an oblique view of tilt-rotor aircraft 201 (FIG. 2) depicting various optical attocells supported by different exterior aircraft lights, where those lights are functioning a LC access points. The rotary systems 202 have been rotated forward on nacelles 204 so that tilt-rotor aircraft 201 is configured for flight in an airplane mode; however, the example optical attocells would also be supported during helicopter mode and transition mode flight. In one embodiment, one or more external lights on tilt-rotor aircraft 201 are configured to operate as light communication access points, such as by incorporating device 300 (FIG. 3) into the external lights of aircraft 201. FIG. 4 depicts representative coverage regions or optical attocells for each of the exterior lights according to an example embodiment. For example, tail position light 210 may provide for attocell 410, and wingtip position lights 211a,b provide coverage in attocell 411a,b, respectively.

Fixed lighting systems on aircraft may provide coverage in limited regions. For example, wingtip position lights 211a,b may be green and red lights, respectively, that are generally visible only within a segment that is approximately 110° wide extending away from the aircraft's forward centerline on either side of the aircraft, and taillight 210 may be a white light is only visible within a 140° segment centered around the aircraft's rear centerline. Although depicted in two dimensions, the aircraft external lights provide a three dimensional coverage area that extends above and below the aircraft unless blocked by the fuselage, wings, engines, or other aircraft structures.

Top anti-collision light 212 may be a high-intensity white strobe light or a red rotating beacon light that provides 360° coverage above aircraft 201 in attocell 412. A similar coverage area may be available below aircraft 201 using bottom anti-collision light 213. Formation lights 214a,b may be, for example, low intensity green lights that provide coverage in attocells 414a,b, respectively. The location and intensity of formation lights 214a,b may render them visible within a smaller field of view and/or distance compared to the aircraft's position lights and anti-collision lights. Additionally, it will be understood that the dimensions of the attocells 410-414 as illustrated in FIG. 4 are intended to be examples only and are not limiting as to the azimuth, elevation, or range of the coverage areas supported by light communications onboard aircraft 201.

Depending on the current flight mode for tiltrotor aircraft 201, rotor tip lights 217 rotate in a generally vertical or horizontal plane or at an angle in between during conversion mode flight. Each rotor tip light may operate as a separate LC transmitter and/or LC receiver. The rotor tip lights 217 on each proprotor 202 may function individually, such as detecting and/or transmitting a unique LC signal from each rotor blade 203. Alternatively, in other embodiments, the rotor tip lights 217 may cooperatively operate to detect and/or transmit the same LC signals. For example, the same LC signal may be provided to each rotor tip light 217 by a VMC 319 for transmission. Similarly, the LC signals detected by each rotor tip light 217 may be combined, such as by multiplexing or diversity combining, to create one signal to be processed by VMC 319.

While the flight operations component of aircraft exterior lights 210-215 (e.g., lights 301) are visible lights in the colors noted above (e.g., green, red, white), it will be understood that co-located LC lights (e.g., lights 303) may be any visible or invisible color or frequency. For example, while the exterior tail light 210 is white, the corresponding LC lights at that position may also be a visible white light. Alternatively, the LC tail lights may operate at an invisible frequency or may transmit a visible non-white light. In some applications, operational procedures, safety concerns, mission requirements, and aviation regulations may limit the visible frequencies that are actually available for the LC data lights at each exterior light location.

The optical attocells 210-214 are fixed relative to aircraft 201 so that during flight, the attocells 210-214 will move with the aircraft. In order to communicate using LC signals, the sender and/or receiver for the other participants to a communication, such as other aircraft, vehicles, or ground stations, must be within at least one of the optical attocells 210-214 and generally pointing toward the LC sensors and/or LC data light. This allows aircraft 201 to selectively transmit LC signals only in the attocells that are required to cover the other party, which reduces both required power and exposure of the LC data signals to other parties. As a result, light communications can provide secure communications for aircraft 201 with a low risk of detection.

In other embodiments, light communication may be provided using lights that are located on an aircraft at positions other than typical locations for aircraft exterior lights. For example, LC lights and LC sensors may be positioned at any location on the fuselage, engines, wings, or flight control surfaces. Moreover, such LC lights may serve only to provide light communication and may have no position, formation, or anti-collision function.

The LC access points on aircraft 201 may be used to provide location information in some embodiments. For example, if LC signals are detected at aircraft 201 from a ground station 401 using LC access point 211b, then it is known that the ground station is within coverage area or optical attocell 411b. This may provide general location information, such as that the ground station 401 is located in the port forward quarter relative to aircraft 201. In the example illustrated, this is a broad area comprising a three-dimension pie slice 110° wide with no ranging information. The relative bearing of ground station 401 to aircraft 201 may be determined with higher accuracy if, for example, LC access point 211b comprised multiple LC sensors 313 that were arranged to cover limited subsections of attocell 411b. By determining which of the LC sensors 313 detected ground station 401, or by processing received LC signal strengths across multiple LC sensors 313, it may be possible to narrow down the relative bearing to a subsection of attocell 411b.

Alternatively, the location of a ground station may be more accurately determined in some embodiments if the ground station is detected by two or more LC access points on aircraft 201. For example, ground station 402 is detected by LC access points 211b and 214b since and, therefore, is located within both attocells 411b and 414b. Ground station 402 can be in both attocells 411b and 414b only if it falls within overlapping coverage area 403. Accordingly, when ground station 402 is detected by two LC access points, its location or relative bearing can be narrowed down to area 403.

Another way to narrow down the relative bearing of ground station 401 is to turn aircraft 201 and observe when ground station 401 is no longer detected by LC access point 211b. For example, if aircraft 201 in FIG. 4 begins a left turn (i.e., the direction shown by arrow 404), then ground station 401 to the right relative to aircraft 201. Eventually, ground station 401 will no longer be detected by LC access point 211b. This will occur when ground station 401's position relative to aircraft 201 has moved out of optical attocell 411b, which corresponds to a relative bearing that is parallel to the right edge of attocell 411b (i.e., generally along the centerline of the aircraft). When this occurs, the relative bearing to ground station 401 from aircraft 201 can be determined with a higher degree of accuracy. If aircraft 201 continues its turn, eventually ground station 401 will appear in optical attocell 411a (shown as location 401a in FIG. 4) and will be detected by LC access point 211a. Similar to what happens when ground station 401 dropped out of attocell 411b, when the ground station 401a is detected by LC access point 211a, the relative bearing to ground station 401a can be determined with a higher degree of accuracy. The relative bearing at the time of detection will be a line along the left side of attocell 411a. If the LC sensors are accurate enough to determine relative bearing to an LC signal source with a sufficient degree of accuracy, then a ground station 401, 402 may be used for VOR-type navigation in some embodiments.

Although the above example refers to ground stations 401 and 402, it will be understood that relative bearing information may be obtained in a similar manner for any LC transmitting device, including other aircraft, ground vehicles, ships, buildings, and handheld portable transmitters. In some embodiments, certain functions, operations, or applications associated with aircraft 201 may be enable or disabled based upon the relative location of the ground stations 401 and 402. For example, if ground station 402 is associated with an airport area, then, upon detection of LC signals from ground station 402, the aircrew may receive a warning not to exceed 200 KIAS within Class C/D airspace. Such warnings may be presented on a navigation display, for example, and/or may be an audible message played on a crew headset.

FIG. 5 depicts a group of helicopters 501-504, such as a plurality of helicopters 101 (FIG. 1), that are configured to use light communication to exchange voice, data, and other information. Lead helicopter 501 transmits data using LC signals broadcast from LC access points 505a,b, which are mounted on the horizontal stabilizers. LC access points 505a,b support LC signals in coverage areas or optical attocells 506a,b, respectively. LC access points 505a,b may be position lights, for example, or may be standalone LC devices that do not provide aircraft lighting. Helicopter 502 has an LC access point 507 that is within coverage area 506a. LC access point 507 may be a formation light, for example, or may be standalone LC device that does not provide aircraft lighting. Helicopter 502 is capable of receiving LC data signals from helicopter 501 using LC access point 507, which also broadcasts LC data signals in area 508. LC access point 505a on helicopter 501 is within coverage area 508 and, therefore, should be capable of receiving LC data signals from helicopter 502. This allows configuration allows helicopters 501 and 502 to communicate using LC signals over an LC channel established between LC access points 505a and 507.

Similarly, helicopter 503 has an LC access point 509 that is within coverage area 506b of helicopter 501. LC access point 509 may be a formation light, for example, or may be standalone LC device that does not provide aircraft lighting. Helicopter 503 is capable of receiving LC data signals from helicopter 501 using LC access point 509, which also broadcasts LC data signals in area 510. LC access point 505b on helicopter 501 is within coverage area 510 and, therefore, should be capable of receiving LC data signals from helicopter 503. This configuration allows helicopters 501 and 503 to communicate using LC signals over an LC channel established between LC access points 505b and 509.

Helicopters 502 and 503 may be able to communicate directly with each other if their respective coverage areas 508 and 510 are large enough. The size of these coverage areas 508, 510 depends upon the strength of the LC lights and the sensitivity of the LC sensors in LC access points 507 and 509, respectively. When broadcasting LC signals from LC access point 507, LC data from helicopter 502 may be received by both helicopters 501 and 503 since both have LC access points 505a, 509 within coverage area 508. Similarly, both helicopters 501 and 502 have LC access points 505b, 507 within coverage area 510. Accordingly, LC signals broadcast from LC access point 509 may be received at both helicopters 501 and 502 if the LC signals are strong enough to reach the other aircraft and the LC sensors are able to detect the signals.

When operating in the formation illustrated in FIG. 5, helicopter 501 does not have an LC access point that provides coverage for both helicopters 502 and 503. Accordingly, helicopter 501 must use both LC access points 505a and 505b either simultaneously or sequentially to communicate with helicopters 502 and 503 using LC signals. This configuration has the benefit, for example, of allowing helicopter 501 to pass information that is relevant to the crew of helicopter 502 only to helicopter 502 using LC access point 505a. Helicopter 503 would not detect LC signals sent by LC access point 505a and, therefore, would not receive any confidential or irrelevant information that was sent to helicopter 502. If helicopter 501 wanted to pass similar information to helicopter 503, the LC data would be rebroadcast using LC access point 505b.

Helicopter 503 may transmit data to helicopter 504 using LC signals broadcast from LC access point 511, which is mounted on a horizontal stabilizer. LC access point 511 support LC signals in area 512. LC access point 511 may be a position light or a dedicated LC device that does not provide aircraft lighting. Helicopter 504 has an LC access point 513 that is within coverage area 512. LC access point 513 may be a formation light or may be a dedicated LC device. Helicopter 504 is capable of receiving LC data signals from helicopter 502 using LC access point 513, which also broadcasts LC data signals in area 514. LC access point 511 on helicopter 503 is within coverage area 514 and, therefore, should be capable of receiving LC data signals from helicopter 504. This configuration allows helicopters 503 and 504 to communicate using LC signals.

Depending upon the size of coverage areas 506b, 508 and 514, helicopters 501 and 502 may be able to communicate directly with helicopter 504. The size of these coverage areas 506b, 508, and 514 depends upon the strength of the LC lights and the sensitivity of the LC sensors in LC access points 505b, 507, and 513, respectively. However, if these coverage areas do not overlap the other helicopter's LC access point, then helicopter 504 may be able to communicate only with helicopter 503 when using LC signals. This situation may require helicopter 503 to act as a relay so that communications from lead helicopter 501 are passed to helicopter 504 and vice versa.

It will be understood that the aircraft formation and arrangement of LC access points illustrated in FIG. 5 is just one example of using LC communications among multiple aircraft. In other embodiments, aircraft 501-504 may be in any position relative to each other, such as in a coordinated formation or operating independently. Any number of additional aircraft of the same or different type may also communicate with aircraft 501-504 using LC communications. Further, it will be understood that LC access points 505a,b, 507, 509, 511, and 513 are merely representative and that any standard or specialized light on each aircraft may be used as an LC access point in other embodiments.

FIG. 6 is a block diagram illustrating systems within helicopter 503 that support light communication relay functionality in one embodiment. Helicopter has a first LC access point 509 on one side of the rotorcraft and has a second LC access point 511 on another side of the rotorcraft. Both LC access points are coupled to a communication system 310 either directly or through VMC 319. When LC signals are received from helicopter 501 at first LC access point 507, the LC signals are provided to communication system 310. Alternatively, the data carried by the LC signals may be decoded at the first LC access point 507 and the decoded data sent to communication system 310. The communication system 310 then processes the received LC data as appropriate. In the relay configuration, communication system 310 may forward the LC data to second LC access point 511 where new LC signals are created using the LC data and transmitted to helicopter 504. When LC signals are received at second LC access point 511 from helicopter 504, the process works in reverse. The LC data received at LC access point 511 is sent to communication system 310, which then forwards the LC data to first LC access point 509 where new LC signals are created using the LC data and transmitted to helicopter 501.

Communication system 310 may screen or otherwise process the received LC signals and LC data and may only forward or relay certain types of transmissions. For example, communication system 310 may analyze decoded LC data and identify one or more of a sender identification, a destination identification, a priority designation, a confidentiality classification, a keyword, or the like. Communication system 310 may then determine whether or not to relay the LC signals and the LC data based upon the sender, recipient, content, priority, and/or classification of the information. Alternatively, the content of the LC signals may be classified, and signal-relay decisions may be based upon some characteristic of the signals. For example, the frequency of the LC signals may indicate whether or not to forward data, such as where certain frequencies are predesignated for mass broadcast and other frequencies indicate that relaying of LC signals should be restricted to preselected recipients.

Communication system 310 and the first and second LC access points 509, 511 may be in direct communication with other aircraft systems, such as a crew member headset 601, flight control computer 312, and navigation system 311. For example, voice data carried by the LC signals may be sent to headset 601, aircraft control data in the LC signals are sent to flight control computer 312, and navigation data is sent to navigation system 311. The navigation system 311 may also receive information regarding which LC access point detected LC signals. The navigation system 311 may then present such information to aircrew, such as on a navigation display screen, to show a relative bearing to a transmitting LC device.

Helicopter 503 may have additional LC access points (not shown). Communication system 310 may determine which LC access points should be selected for relay transmissions based upon the sender, recipient, content, priority, and/or classification of the LC signals or other information.

Referring to FIG. 5, in other embodiments, helicopters 501-504 may be any manned or unmanned aircraft. For example, aircraft 501-504 may represent a multitude of deployable swarm unmanned aerial systems capable of intercommunication and coordinated missions. Unmanned aircraft systems may be networked together such that they are capable of cooperating with one another to exhibit swarm behavior. Such swarm unmanned aircraft systems may have the ability to dynamically adapt responsive to changing conditions or parameters including the ability for group coordination, distributed control, distributed tactical group planning, distributed tactical group goals, distributed strategic group goals and/or fully autonomous swarming. Aircraft 501-504 may use relayed LC signals as described herein to support swarm networking and cooperation by ensuring that all members of the swarm receive commands, status information, and other group data.

Embodiments of the present systems and methods for providing light communications, as described herein, may be implemented or executed, at least in part, by one or more computer systems. FIG. 7 is a block diagram depicting a device 700, such as an LC access point 300 communication system 310, navigation system 311, flight control computer 312, etc., according to an example embodiment. As illustrated, device 700 includes one or more processors 701A-N coupled to a system memory 702 via bus 703. Device 700 may further include a network interface 704 coupled to bus 703. Network interface 704 may provide a wired connection to an external aircraft network 705, which may provide communication connections to other aircraft systems and equipment. One or more input/output (I/O) controllers 706 are coupled to devices, such as a cursor control device 707 (e.g., a mouse, touchpad, or stylus), keyboard 708, display(s) 709, etc. Each of devices 707, 708, and 709 may be integral to device 700 or may be a separate component (i.e., peripheral) that is capable of communicating with I/O controller 706 via a wired connection (e.g., serial port, Universal Serial Bus port) or wireless connection (e.g., Wi-Fi, Bluetooth, Near Field Communications Link, etc.). Other devices, such as microphones, speakers, scanners, printers, etc., may also be coupled to I/O controller 706.

In various embodiments, device 700 may be a single-processor system including one processor 701A, or a multi-processor system including two or more processors 701A-N (e.g., two, four, eight, or more processors). Processors 701 may be any processor capable of executing program instructions. For example, in various embodiments, processors 701A-N may be general-purpose or embedded processors implementing any of a variety of Instruction Set Architectures (ISAs), such as the x86, PowerPC®, ARM®, SPARC®, or MIPS® ISAs, or any other suitable ISA. In multi-processor systems, each of processors 701A-N may commonly, but not necessarily, implement the same ISA. Also, in some embodiments, at least one processor 701 may include a Graphics Processing Unit (GPU) or another dedicated graphics-rendering device.

System memory 702 may be configured to store program instructions and/or data accessible by processor 701. In various embodiments, system memory 702 may be implemented using any suitable memory technology, such as Static Random-Access Memory (SRAM), Synchronous Dynamic RAM (SDRAM), nonvolatile/Flash-type memory, or any other type of memory. As illustrated, program instructions and data implementing certain operations and modules such as those described herein may be stored within system memory 702 as program instructions 710 and data storage 711, respectively. In other embodiments, program instructions and/or data may be received, sent, or stored upon different types of computer-accessible media or on similar media separate from system memory 702.

A computer-accessible medium may include any tangible and/or non-transitory storage media or memory media such as electronic, magnetic, or optical media—e.g., disk or CD/DVD-ROM coupled to device 700 via bus 703. The terms "tangible" and "non-transitory," as used herein, are intended to describe a computer-readable storage medium (or "memory") excluding propagating electromagnetic signals but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, Random Access Memory (RAM). Program instructions and data stored on a tangible computer-accessible storage medium in non-transitory form may further be transmitted by transmission media or signals, such as electrical, electromagnetic, or digital signals, which may be conveyed via a communication medium such as a network and/or a wireless link.

System memory 702 may include program instructions 710 that are configured to implement certain embodiments described herein and data storage 711 comprising various data accessible by program instructions 710. Program instructions 710 may be implemented in various embodiments using any desired programming language, scripting language, or combination of programming languages and/or scripting languages (e.g., C, C++, C #, Java™ JavaScript™, Perl, etc.). Data storage 711 may include data that may be used in these embodiments (e.g., recorded communications, profiles for different modes of operations, etc.). In other embodiments, other or different software elements and data may be included.

In an embodiment, bus 703 may be configured to coordinate I/O traffic between processor 701, system memory 702, and any other devices in the system, including network interface 704 or other interfaces, such as I/O interfaces 706. In some embodiments, bus 703 may perform any necessary protocol, timing, or other data transformations to convert data signals from one component (e.g., system memory 702) into a format suitable for use by another component (e.g., processor 701). In some embodiments, bus 703 may include support for devices attached through various types of peripheral buses, such as a variant of the Peripheral Component Interconnect (PCI) bus standard or the Universal Serial Bus (USB) standard, for example. In some embodiments, the function of bus 703 may be split into two or more separate components, such as a northbridge chipset and a southbridge chipset, for example. In addition, in some embodiments some or all the functionality of bus 703, such as an interface to system memory 702, may be incorporated directly into processor(s) 701A-N.

Network interface 704 may be configured to allow data to be exchanged between device 700 and other devices attached to a network, such as other computer systems, or between nodes of device 700. In various embodiments, network interface 704 may support communication via wired or wireless general data networks, such as any suitable type of Ethernet network, for example, via telecommunications/telephony networks such as analog voice networks or digital fiber communications networks, via storage area networks such as Fibre Channel SANs, or via any other suitable type of network and/or protocol.

I/O interfaces 706 may, in some embodiments, enable communications with one or more display terminals, keyboards, keypads, touchpads, scanning devices, voice or optical recognition devices, mobile devices, or any other devices suitable for entering or retrieving data by one or more devices 700. Multiple I/O controllers 706 may be present in device 700 or may be distributed on various nodes of device 700. In some embodiments, I/O devices may be separate from device 700 and may interact with one or more nodes of device 700 through a wired or wireless connection, such as over network interface 704.

Device 700 may be capable of receiving power that has been transmitted by visible or invisible light. Photovoltaic module 712 is configured to receive light, such as light broadcast by power lights 302 (FIG. 3), and to produce electricity. The electricity is then provided to a battery or power supply 713.

Light communication is supported using a light sensor 714 and a receiver/decoder 715 to receive data and a transmitter/encoder 716 and light transmitter 717 to transmit data. Light sensor 714 may be, for example, a camera, image sensor, or photodetector, such as a CMOS sensor or other electronic chip that converts photons to electrons for digital processing. Light sensor 714 detects light and generates an electronic signal for receiver/decoder 715, which extracts data bits that are carried by the light. The extracted bits may carry information that can be used by processors 701A-N. Data can also be sent using LC by encoding data bits using transmitter/encoder 716 into a signal that drives light transmitter 717, which then broadcasts the information as light signals. Light transmitter 717 may be an LED or laser, for example. Light sensor 714 and light transmitter 717 may use invisible (e.g., infrared) and/or visible light spectrum for high speed data communication.

Although the example device 700 depicts a system having both transmit and receive capabilities for light communications, it will be understood that in other embodiments only LC transmit components (i.e., transmitter/encoder 716 and light transmitter 717) or only LC receive components (i.e., light sensor 714 and receiver/decoder 715). Such single-direction LC systems may be used, for example, when the device 700 only needs to transmit or only needs to receive data via an LC channel.

In other embodiments, the light communication transmit and receive components (i.e., light sensor 714, receiver/decoder 715, transmitter/encoder 716, and light transmitter 717) may be external to device 700, such as a separate dongle or USB device that is attached using IO interface 706 or network interface 704 to make device light-communication capable.

Device 700 may be addressed and/or identified using, for example, Internet Protocol (IP) address, Media Access Control (MAC) address, or the like.

The various operations described herein may be implemented in software executed by processing circuitry, hardware, or a combination thereof. The order in which each operation of a given method is performed may be changed, and various operations may be added, reordered, combined, omitted, modified, etc. It is intended that embodiment(s) described herein do not embrace all such modifications and changes and, accordingly, the above description should be regarded in an illustrative rather than a restrictive sense.

A person of ordinary skill in the art will appreciate that device 700 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It should be understood that the various operations described herein may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

An example embodiment is directed to an access point for providing light communication for an aircraft comprising an LC transmitter mounted on an aircraft fuselage, wherein the LC transmitter is configured to broadcast light signals within a defined region outside the aircraft, an LC receiver mounted on the aircraft fuselage, wherein the LC receiver is configured to receive light signals broadcast by a remote LC device, a controller coupled to the LC transmitter and the LC receiver, the controller configured to manage LC signals in the access point, and an interface between the controller and an aircraft data network. The LC transmitter may be a Light Emitting Diode (LED), a laser, or any other visible or invisible light source. The LC receiver may be a photodetector or any other device capable of detecting visible or invisible light. The light signals may be transmitted in a visible light spectrum, an invisible light spectrum, or both. The remote LC device may be a ground station, an aircraft, a ground vehicle, a ship, a building, or a portable transmitter. The remote LC device may be associated with an airport, such as approach lights, runway lights, taxiway lights, an airport beacon, an air traffic control tower signal lamp, or the like.

The access point may further comprise a processor in the controller, wherein the processor is configured to control the access point according to executable code, and memory for storing data and executable code, wherein the executable code comprises instructions for causing the access point to establish light communication with the remote LC device.

The executable code may further comprise instructions for causing the processor to identify a relative location of the remote LC device to the aircraft based upon LC signals received from the remote LC device. The executable code may further comprise instructions for causing the processor to enable one or more functions on the aircraft based upon the relative location of remote LC device. The executable code may further comprise instructions for causing the processor to disable one or more functions on the aircraft based upon the relative location of remote LC device.

The executable code may further comprise instructions for causing the processor to receive a first set of LC signals from a first device via the LC receiver and to transmit or retransmit the first set of LC signals to a second device via the LC transmitter.

The executable code may further comprise instructions for causing the processor to establish a session with the remote LC device using light communication with the access point and to exchange session data with the remote LC device. The session and session data may be associated with one or more vehicle management computer, or navigation, communication, or flight control system.

In another example embodiment, a method for using light communication between aircraft comprises receiving a first light communication signal at an LC receiver mounted on an aircraft fuselage, decoding the first LC signal to extract first data, providing the first data to an aircraft system, receiving second data from the aircraft system, encoding the second data to create a second LC signal, and transmitting the second LC signal at an LC transmitter mounted on the aircraft fuselage. The aircraft system may be one or more vehicle management computer, or a navigation, communication, or flight control system. The LC receiver may be a photodetector, and the LC transmitter transmits the second LC signal using an LED or a laser. The light signals may be in a visible light spectrum, an invisible light spectrum, or both.

The method may further comprise, based upon the first LC signal, identifying a location of a remote LC device relative to the aircraft. The method may further comprise, based upon the relative location of remote LC device, enable or disable one or more functions on the aircraft.

The method may further comprise, wherein the first LC signal is received from a first remote LC device, wherein the second LC signal is transmitted to a second remote LC device, the content of the first data and the second data are substantially the same so that the first remote LC signal is relayed from the first remote LC device to the second remote LC device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. An access point for providing light communication (LC) for an aircraft, comprising:
   an LC transmitter mounted on an aircraft fuselage, the LC transmitter configured to broadcast light signals within a defined region outside the aircraft;
   an LC receiver mounted on the aircraft fuselage, the LC receiver configured to receive light signals broadcast by a remote LC device;
   a controller coupled to the LC transmitter and the LC receiver, the controller configured to manage LC signals in the access point; and
   an interface between the controller and an aircraft data network.

2. The access point of claim 1, wherein the LC transmitter is a Light Emitting Diode (LED).

3. The access point of claim 1, wherein the LC transmitter is a laser.

4. The access point of claim 1, wherein the LC receiver is a photodetector.

5. The access point of claim 1, wherein the light signals are in a visible light spectrum, an invisible light spectrum, or both.

6. The access point of claim 1, wherein the remote LC device is a ground station, an aircraft, a ground vehicle, a ship, a building, or a portable transmitter.

7. The access point of claim 1, further comprising:
   a processor in the controller configured to control the access point according to executable code; and
   memory for storing data and executable code, wherein the executable code comprises instructions for causing the access point to establish light communication with the remote LC device.

8. The access point of claim 7, wherein the executable code further comprises instructions for causing the processor to:
   identify a relative location of the remote LC device to the aircraft based upon LC signals received from the remote LC device.

9. The access point of claim 8, wherein the executable code further comprises instructions for causing the processor to:
   enable one or more functions on the aircraft based upon the relative location of remote LC device.

10. The access point of claim 8, wherein the executable code further comprises instructions for causing the processor to:
    disable one or more functions on the aircraft based upon the relative location of remote LC device.

11. The access point of claim 7, wherein the executable code further comprises instructions for causing the processor to:
    receive a first set of LC signals from a first device via the LC receiver; and
    transmit the first set of LC signals to a second device via the LC transmitter.

12. The access point of claim 7, wherein the executable code further comprises instructions for causing the processor to:
    establish a session with the remote LC device using light communication with the access point; and
    exchange session data with the remote LC device.

13. The access point of claim 12, wherein the session and session data are associated with one or more vehicle management computer, navigation system, communication system, or flight control system.

14. A method, comprising:
    receiving a first light communication (LC) signal at an LC receiver of an LC access point mounted on an aircraft fuselage;
    decoding the first LC signal in the LC access point to extract first data;
    providing the first data to an aircraft system;
    receiving second data from the aircraft system;
    encoding the second data, in the LC access point, to create a second LC signal; and
    transmitting the second LC signal at an LC transmitter of the LC access point mounted on the aircraft fuselage.

15. The method of claim 14, wherein the aircraft system is one or more vehicle management computer, navigation system, communication system, or flight control system.

16. The method of claim 14, wherein the LC receiver is a photodetector, and wherein the LC transmitter transmits the second LC signal using a Light Emitting Diode (LED) or a laser.

17. The method of claim 14, wherein the light signals are in a visible light spectrum, an invisible light spectrum, or both.

18. The method of claim 14, further comprising:
    based upon the first LC signal, identifying a location of a remote LC device relative to the aircraft.

19. The method of claim 18, further comprising:
    based upon the relative location of remote LC device, enabling or disabling one or more functions on the aircraft.

20. The method of claim 14, wherein the first LC signal is received from a first remote LC device, wherein the second LC signal is transmitted to a second remote LC device, and wherein the content of the first data and the second data are substantially the same so that the first remote LC signal is relayed from the first remote LC device to the second remote LC device.

* * * * *